(12) United States Patent
Park (10) Patent No.: US 9,302,832 B2
(45) Date of Patent: Apr. 5, 2016

(54) COMPOSTABLE CONTAINER WITH ELONGATE CONNECTOR

(71) Applicant: Greater Good, Inc., Chestnut Hill, MA (US)

(72) Inventor: Sung Park, Chestnut Hill, MA (US)

(73) Assignee: Greater Good, Inc., Chestnut Hill, MA (US)

( * ) Notice: Subject to any disclaimer, the term of this patent is extended or adjusted under 35 U.S.C. 154(b) by 0 days.

(21) Appl. No.: 14/270,000

(22) Filed: May 5, 2014

(65) Prior Publication Data

US 2014/0353202 A1    Dec. 4, 2014

Related U.S. Application Data

(60) Provisional application No. 61/828,287, filed on May 29, 2013.

(51) Int. Cl.
*B65D 65/46* (2006.01)
*B65D 6/08* (2006.01)
*B65D 8/00* (2006.01)
(Continued)

(52) U.S. Cl.
CPC ............... *B65D 65/466* (2013.01); *B65D 3/30* (2013.01); *B65D 7/14* (2013.01); *B65D 15/08* (2013.01); *B65D 21/0233* (2013.01); *Y02W 90/13* (2015.05); *Y02W 90/14* (2015.05)

(58) Field of Classification Search
CPC ........ B32B 27/10; D21H 26/38; B65D 25/00; B65D 65/466; B65D 3/06; B65D 11/02; B65D 15/22; B65D 7/18; B65D 7/14; B65D 7/20; B65D 1/38; B65D 21/046; Y02W 90/13; Y02W 90/14
See application file for complete search history.

(56) References Cited

U.S. PATENT DOCUMENTS 1,086,002 A * 2/1914 Stewart ................. 141/390
2,553,728 A * 5/1951 Skreberg ............... 220/9.2
(Continued)

FOREIGN PATENT DOCUMENTS

EP    1174346    1/2002
JP    10058482   3/1998
(Continued)

OTHER PUBLICATIONS

Hasegawa, JP10-058482, Mar. 3, 1998 Translation.*
(Continued)

*Primary Examiner* — Andrew Perreault
(74) *Attorney, Agent, or Firm* — Sean D. Detweiler, Esq.; Morse, Barnes-Brown & Pendleton, P.C.

(57) ABSTRACT

A compostable container has a top frame with a top frame opening, a base, an elongate connector coupling the top frame with the base, and a wall. The top end of the wall is coupled to the top frame, the bottom end of the wall is coupled to the base, the first side end of the wall is coupled to the elongate connector, and the second side end of the wall is coupled to the elongate connector, in such a way as to prevent direct exposure of the edges of the wall to the interior volume of the container and any water-based liquid substance contained within the container. The wall is formed of a water-permeable, biodegradable, and compostable material coated with a biodegradable, water-impermeable coating that forms a lining across the interior facing wall surface of the wall.

27 Claims, 11 Drawing Sheets

(51) Int. Cl.
  *B65D 21/02* (2006.01)
  *B65D 3/30* (2006.01)

(56) References Cited

U.S. PATENT DOCUMENTS

| | | | |
|---|---|---|---|
| 2,581,516 A * | 1/1952 | Cohen | A47G 19/2272 220/710 |
| 2,986,322 A | 5/1961 | Atkinson | |
| 3,083,888 A | 4/1963 | Miller | |
| 4,005,799 A | 2/1977 | Mannaerts | |
| 4,163,517 A | 8/1979 | Kappler et al. | |
| 4,817,815 A | 4/1989 | Stahlecker | |
| 4,895,298 A | 1/1990 | Reil | |
| 5,353,472 A | 10/1994 | Benda et al. | |
| 6,645,584 B1 | 11/2003 | Kuusipalo et al. | |
| 8,746,489 B2 * | 6/2014 | Boehler et al. | 220/359.4 |
| 2003/0178426 A1 | 9/2003 | Freek et al. | |
| 2005/0252952 A1 | 11/2005 | Nomula | |
| 2006/0011635 A1 * | 1/2006 | Shibata | 220/485 |
| 2006/0275563 A1 | 12/2006 | Duffy | |
| 2007/0164095 A1 | 7/2007 | Schuetz | |
| 2008/0210694 A1 | 9/2008 | Castonguay | |
| 2009/0101649 A1 | 4/2009 | Kuzelka | |
| 2009/0218390 A1 | 9/2009 | Chang | |
| 2010/0301109 A1 | 12/2010 | Lewis et al. | |
| 2012/0074029 A1 | 3/2012 | Lantinen | |
| 2012/0312814 A1 | 12/2012 | Tolibas-Spurlock et al. | |
| 2013/0025466 A1 | 1/2013 | Fu et al. | |

FOREIGN PATENT DOCUMENTS

| | | |
|---|---|---|
| JP | 2000/302132 | 10/2000 |
| JP | 2002/105887 | 4/2002 |
| SU | 1761612 | 9/1992 |
| WO | WO 97/39958 | 10/1997 |
| WO | WO 2010/022267 | 2/2010 |
| WO | WO 2011/082486 | 7/2011 |

OTHER PUBLICATIONS

ULIN: The Chemical Process of Cellulose to Paper. Dec. 15, 2010 Retrieved from the Internet [retrieved on Aug. 26, 2014]<URL: http://indianapublicmedia.org/amomentofscience/chemical-cellulose-paper/>; p. 1.

ecoevaluator.com: Compostable Bioplastic. archived copy from Jan. 23, 2013. Retrieved from the Internet [retrieved on Aug. 26, 2014) <URL:https://web.archive.org/web/20130123110405/http://iww-wecoevaluator.com/lifestyle/recycling/compostable-bioplastic.html> entire document.

International Search Report for International Application PCT/US2013/051089, dated Nov. 7, 2013.

International Search Report for International Application PCT/US2014/036833, dated Sep. 24, 2014.

European Search Report in Application EP 13823732.6, dated Dec. 4, 2015.

Non-Final Office Action for U.S. Appl. No. 13/945,565 mailed Jan. 15, 2016).

\* cited by examiner

COMPOSTABLE CONTAINER WITH ELONGATE CONNECTOR

RELATED APPLICATION

This application claims priority to, and the benefit of, U.S. Provisional Application No. 61/828,287, filed May 29, 2013, for all subject matter common to both applications. The disclosure of said provisional application is hereby incorporated by reference in its entirety.

FIELD OF THE INVENTION

The present invention relates to containers suitable for use with beverages and foods. More particularly, the present invention relates to a container that, as a whole, is biodegradable and compostable, while maintaining a water-impermeable interior.

BACKGROUND OF THE INVENTION

Pre-filled beverage or food containers (e.g., soda cans, canned soups, etc.) are sold in a wide variety of commercial settings and can contain a wide variety of food contents. Pre-filled beverage or food containers often must be water-impermeable for extended periods of time, during which the containers may be shipped, sold, and/or stored all by multiple elements in the supply chain. For these and other reasons, the use of water-permeable materials like cardboard is limited to certain types and/or designs of containers. Furthermore, to ensure that the interiors of such cardboard-based containers are water-impermeable, these cardboard-based containers include coatings or layers (e.g., plastics, foils, waxes, etc.) that often render the container as a whole non-compostable.

SUMMARY

Accordingly, there is a need for a compostable, biodegradable container that maximizes visibility of water-permeable, biodegradable, and compostable components without sacrificing the overall water-impermeability of the container as a whole, or of the interior volume of the container in which fluids are stored. The present invention is directed toward solutions to address this and other needs, in addition to having other desirable characteristics that will be appreciated by one of skill in the art upon reading the present specification.

In accordance with an embodiment of the present invention, a compostable container has a top frame having a top frame opening, a base, an elongate connector coupling the top frame with the base, and a wall. The wall has a top edge at a top end, a bottom edge at a bottom end opposite the top end, a first side edge at a first side end, a second side edge at a second side end opposite the first side end, and an interior facing wall surface extending between the top end, bottom end, first side end, and second side end. The wall, base, elongate connector, and top frame in combination form the container having an interior volume with the top frame opening providing access into the interior volume. The top end is coupled to the top frame, the bottom end is coupled to the base, the first side end is coupled to the elongate connector, and the second side end is coupled to the elongate connector, in such a way as to prevent direct exposure of the top edge, bottom edge, first side edge, and second side edge to the interior volume of the container and any water-based liquid substance contained therein. The wall is formed of a water-permeable, biodegradable, and compostable material having a biodegradable, water-impermeable coating forming a lining across the interior facing wall surface of the wall.

In accordance with aspects of the present invention, the base can have a base frame with a base component coupled thereto. The base component can be formed of a water-permeable, biodegradable, and compostable material having a biodegradable, water-impermeable coating forming a lining across an interior facing surface of the base component. The base can be a solid structure formed of a water-impermeable, biodegradable, and compostable material.

In accordance with aspects of the present invention, the base can be formed of a bioplastic material. The elongate connector can be formed of a bioplastic material. The container can break down into carbon dioxide, water, inorganic compounds, and biomass materials. The container can break down into carbon dioxide, water, inorganic compounds, and biomass materials, at a rate consistent with known compostable materials.

In accordance with aspects of the present invention, the top edge of the wall can be bonded to the top frame by an adhesive. The top edge of the wall can be heat-welded to the top frame.

In accordance with aspects of the present invention, the top frame can extend outward and over the top edge of the wall to maintain the wall in place. The bottom edge of the wall can be bonded to the base by an adhesive. The bottom edge of the wall can be heat-welded to the base. The base can extend outward and below the bottom edge of the wall to maintain the wall in place.

In accordance with aspects of the present invention, the container can have a cover disposed over the top frame opening completely obstructing the top frame opening when in a sealed position and exposing the top frame opening when in an unsealed position. The cover can have a repeated-use hinge cover or a single-use tear cover.

In accordance with aspects of the present invention, the container can be configured to stack on top of and below another container. The top frame can have a mechanical stop at a lower section of the top frame for allowing the container to stack on top of and below another container. This mechanical stop provides an edge for stopping movement of another container inserted into the container.

In accordance with aspects of the present invention, the water-permeable, biodegradable, and compostable material of which the wall is formed can be cellulose. The biodegradable, water-impermeable coating can be polylatic acid (PLA).

In accordance with aspects of the present invention, the top frame can further include an outer frame component with a truss component coupled to and disposed within the outer frame component. The container can be generally conical in shape. The top frame can form a ring and the base can form a ring or a circle.

In accordance with aspects of the present invention, the first side end and second side end can form a seam along the elongate connector where the first side end is coupled to the elongate connector and the second side end is coupled to the elongate connector. The seam can be formed by heat-welding the first side end and second side end along the elongate connector. The seam can be formed by bonding the first side end and second side end along the elongate connector with an adhesive.

In accordance with an aspect of the present invention, the top frame includes an external threading feature along an external surface of the top frame configured to receive and threadedly couple with a cap. In another aspect, the top frame includes an internal threading feature along an internal surface of the top frame configured to receive and threadedly couple with a cap.

In accordance with an aspect of the present invention, the top frame includes an annular projection on an external surface of the top frame.

BRIEF DESCRIPTION OF THE FIGURES

These and other characteristics of the present invention will be more fully understood by reference to the following detailed description in conjunction with the attached drawings, in which.

DETAILED DESCRIPTION

An illustrative embodiment of the present invention relates to a compostable container adapted to hold beverages, other liquids, or other food products. The compostable container can be constructed entirely of a combination of paper or cardboard and biopolymers. Accordingly, an entirety of the container is compostable and biodegradable. The compostable container achieves an environmentally friendly "look and feel" by minimizing the amount of bioplastic component parts that are visible and by maximizing the visibility of component parts made of water-permeable, biodegradable, and compostable material(s) (e.g., cardboard), all while still maintaining structural integrity of the compostable container and the ability of the compostable container to be filled, sealed, and also resealed. The compostable container includes a top frame, base, elongate connector coupling the top frame with the base, and a wall. The elongate connector is shaped and positioned to line and seal the seam of the wall. In this way, the elongate connector provides a water-impermeable barrier along the wall seam in the compostable container where leakage is most likely to occur, shielding the wall seam, and more particularly the exposed edges of the wall, from the liquid contents of the compostable container. The interior of the walls of the compostable container can be coated with a biodegradable, water-impermeable coating forming a lining across the interior facing wall surface to ensure that fluid contained in the interior volume of the compostable container is not permitted to soak through the wall of the compostable container from the inside. Accordingly, in this way, the interior volume of the compostable container can be rendered water-impermeable, such that fluid contents are prevented from escaping from the compostable container or being absorbed by the compostable container. Furthermore, despite the water-impermeability of the compostable container (e.g., from the inside), the container as a whole is biodegradable and compostable.

The present description makes reference to the use of bioplastics as well as various properties, including biodegradability and compostability. As would be appreciated by one of skill in the art, bioplastics are derived from renewable raw materials like starch (e.g. corn, potato, tapioca, etc.), cellulose, soybean protein, lactic acid, and the like. They are not typically hazardous or toxic in production and are able to decompose into materials such as carbon dioxide, water, and biomass when composted. Bioplastics generally can take different lengths of time to completely and fully compost, depending on the particular material. Bioplastics conventionally are intended to be composted in an industrial or commercial composting facility that is able to generate high composting temperatures Crf extended periods (e.g., between about 90-180 days in some instances).

The term "compostable" is intended to have its normal meaning, as would be appreciated by one of skill in the art upon reading the present specification. For example, according to the American Society for Testing & Materials (ASTM), a bioplastic is compostable if it is capable of undergoing biological decomposition in a compost site as part of an available program, such that the plastic is not visually distinguishable and breaks down into carbon dioxide, water, inorganic compounds, and biomass, at a rate consistent with known compostable materials (e.g., cellulose) and if through the process of biological decomposition the bioplastic leaves no toxic residue. Furthermore, most existing international standards define "compostable" to include those materials capable of biodegradation of about 60% within about 180 days (e.g., in combination with other criteria). In general, it will be appreciated upon reading the present specification that for a plastic to be compostable, three criteria must be met: the plastic must be: (a) capable of biodegradation, e.g., the breakdown into carbon dioxide, water, biomass at the same rate as cellulose or paper; (b) capable of disintegration, e.g., the material must be capable of becoming indistinguishable within the compost, such that it is not visible and need not be screened out; and (c) non-eco-toxic, e.g., must not produce any toxic material, such that the resulting compost can support plant growth.

The amount of time required to compost can change depending on a variety of factors. Commercial composting facilities tend to grind materials being composted and agitate (e.g., stir, turn over, etc.) the resulting piles while exposing the piles to high temperatures. This reduces the amount of time required for the materials to compost. However, composting rates at home composts can be significantly lower and can vary depending on how frequently the pile is agitated (e.g., stirred, turned over, etc.), the moisture of the pile, the contents of the materials forming the pile, the temperature of the pile, and other environmental conditions.

To be "biodegradable," a bioplastic must be capable of degrading as a result of naturally occurring microorganism (s), such as bacteria, fungi, and the like. However, unlike compostability, the quality of not leaving behind a toxic residue is not a requirement for biodegradability.

Accordingly, the terms "biodegradability" and "compostability" generally are intended to have their normal meanings and definitions, as would be appreciated by one of skill in the art upon reading the present specification.

FIGS. 1 through 12B, wherein like parts are designated by like reference numerals throughout, illustrate a compostable container according to the present invention. Although the present invention will be described with reference to the figures, it should be understood that many alternative forms can embody the present invention. One of skill in the art will additionally appreciate different ways to alter the parameters disclosed, such as the size, shape, or type of elements or materials, in a manner still in keeping with the spirit and scope of the present invention.

Figure 1:
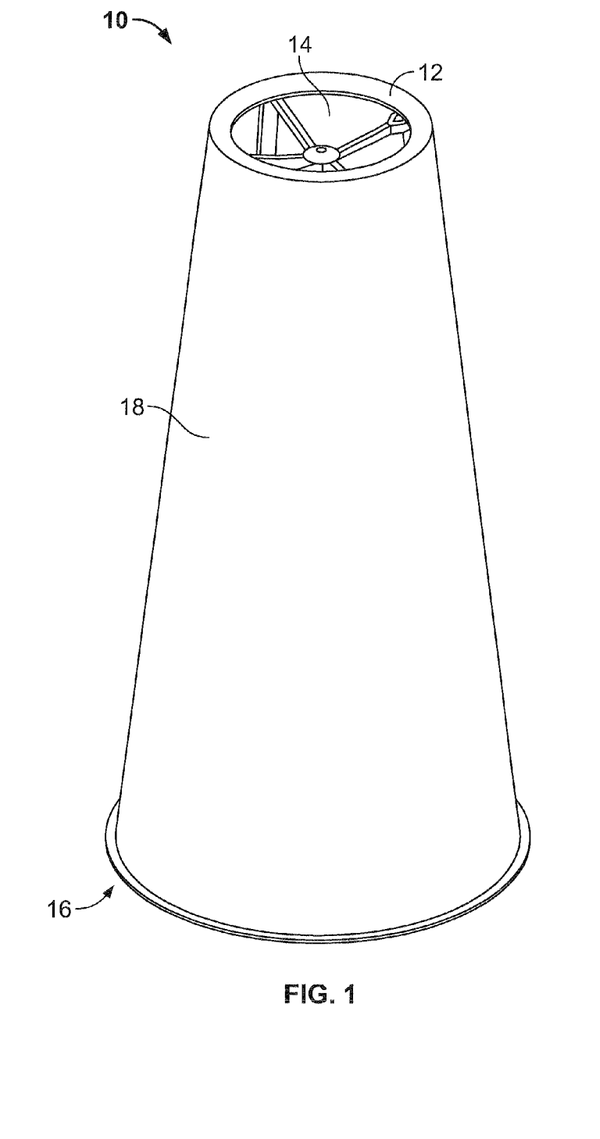
FIG. 1 is a perspective view of a compostable container, according to one aspect of the present invention.

FIG. 1 depicts a perspective view of a compostable container 10 according to an example embodiment of the present invention. As shown in FIG. 1, the compostable container 10 has a top frame 12 having a top frame opening 14, a base 16, and a wall 18. The compostable container 10 is generally conical in shape such that the top frame 12 forms a ring and the base 16 forms a ring. Alternatively, the base 16 can form a circle at the bottom of the compostable container 10.

The compostable container 10 can be broken down into carbon dioxide, water, inorganic compounds, and biomass materials. In particular, the compostable container 10 can be broken down into these materials at a rate consistent with known compostable materials as known by one of skill in the art.

Figure 2:
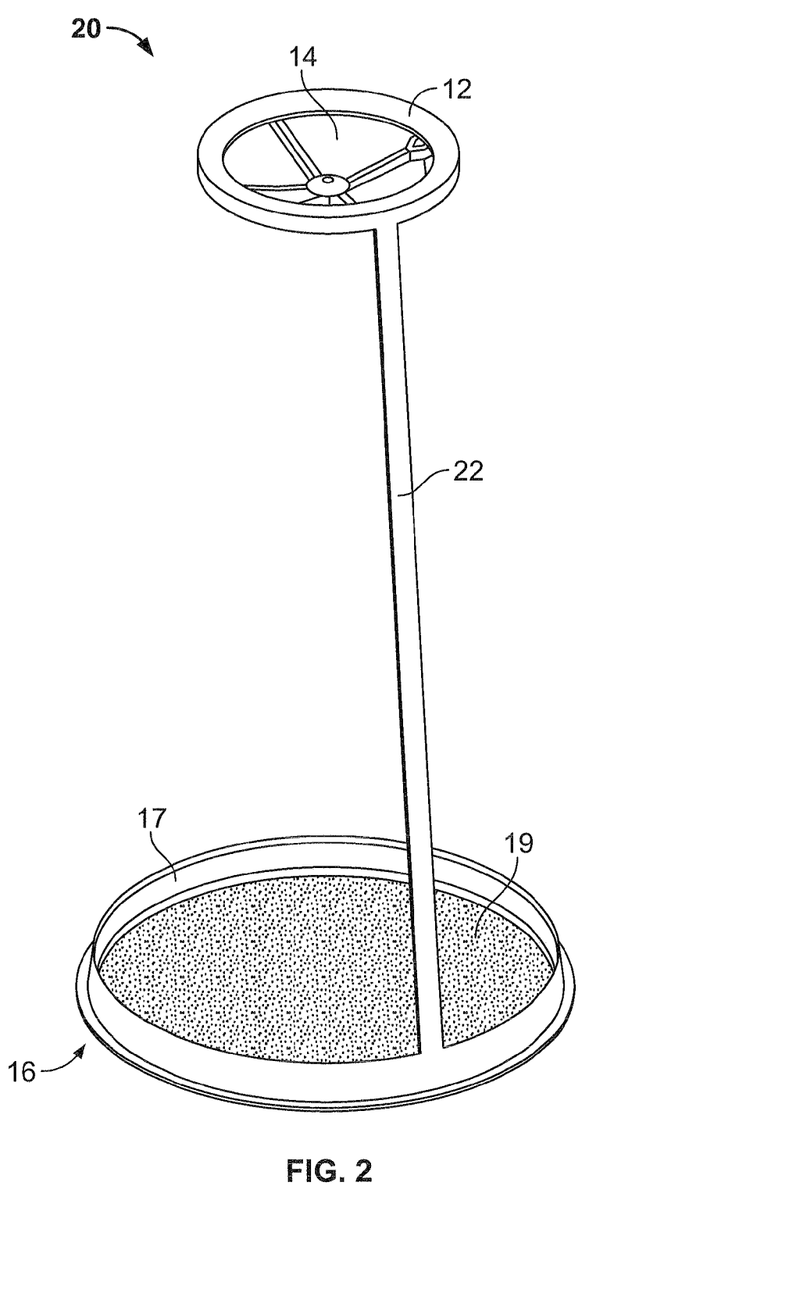
FIG. 2 is a perspective view of a frame of a compostable container, according to one aspect of the present invention.

FIG. 2 depicts a perspective view of one example of a container frame 20 of the compostable container 10. The container frame 20 includes the top frame 12 having a top frame opening 14, base 16, and an elongate connector 22. The elongate connector 22 couples the top frame 12 with the base 16. In one example, the elongate connector 22 is formed of a bioplastic material. The base 16, elongate connector 22, and top frame 12 form the container frame 20 and in combination with the wall 18 form the compostable container 10 having an interior volume with the top frame opening 14 providing access into the interior volume. The container frame 20 can be formed of separate components that are coupled together (e.g., by adhesive, heat welding, or otherwise), or can be formed as a single, unitary, structure.

In this example, the base 16 includes a base frame 17 with a base component 19 that can fit within the base frame 17. The base frame 17 can be formed of a bioplastic material. The base component 19 is formed of a water-permeable, biodegradable, and compostable material. A biodegradable, water-impermeable coating forms a lining across the interior facing surface of the base component 19.

Figure 3:
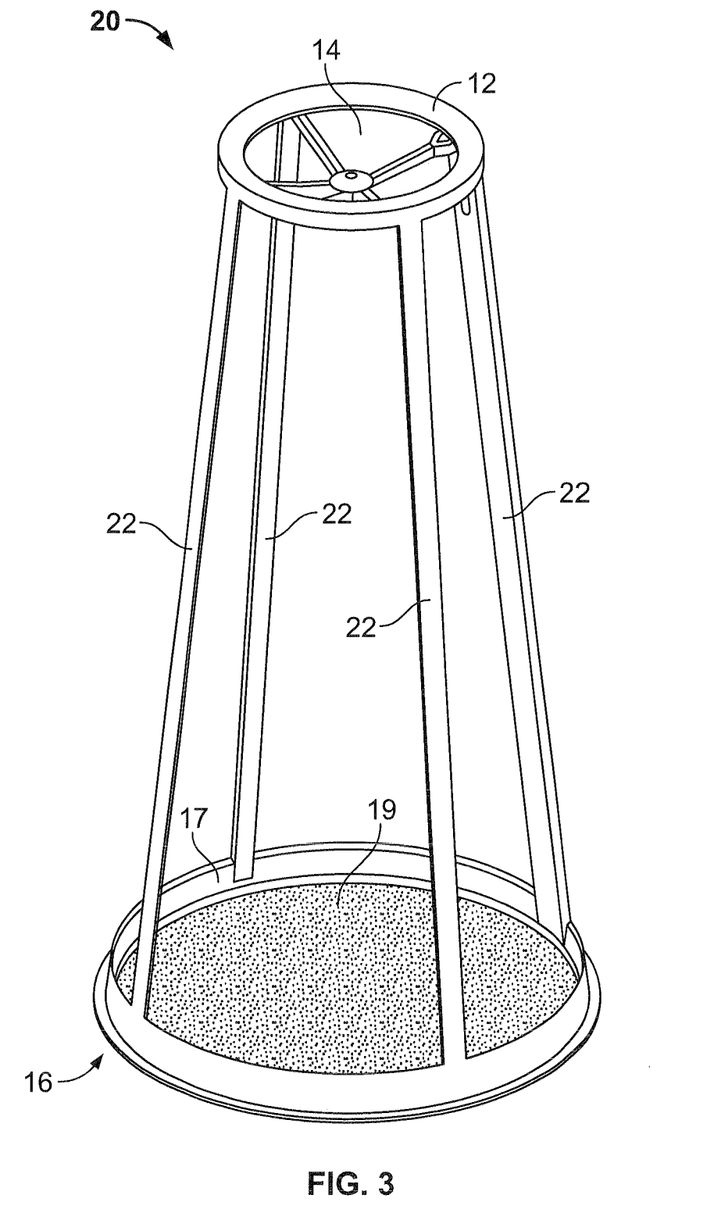
FIG. 3 is a perspective view of another frame of a compostable container, according to one aspect of the present invention.

In another example, the container frame 20 includes four elongate connectors 22 as shown in FIG. 3. As would be appreciated by one of skill in the art, any number of elongate connectors 22 (e.g., one, two, three, four, five, or more) may be used for coupling the top frame 12 with the base 16, such that the present invention is not limited to the single elongate connector 22 shown in FIG. 2, or the four elongate connectors 22 shown in FIG. 3. The container frame 20 can be produced by, for example, a process of injection molding, or by any other known plastics manufacturing process or equivalents thereof that would result in the structure as shown and described.

Figure 4:
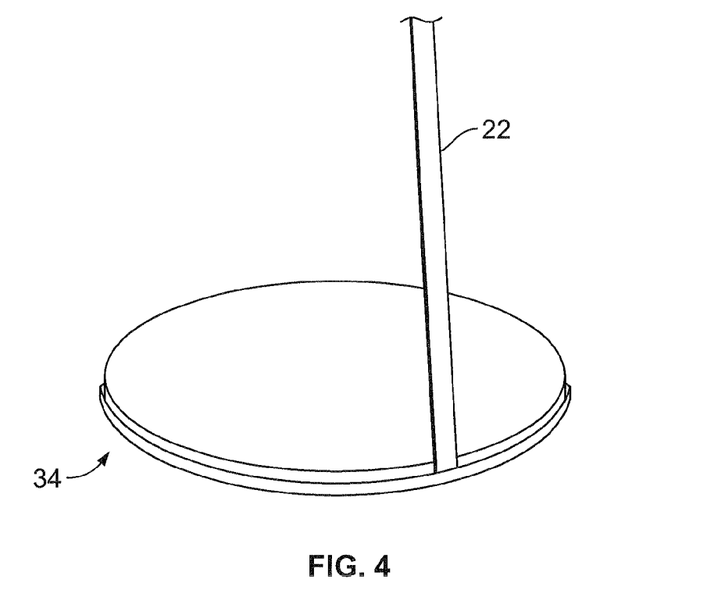
FIG. 4 is a perspective view of a solid base of a compostable container, according to one aspect of the present invention.

FIG. 4 depicts an example sectional view of a solid base 34 as part of a compostable container 10. Unlike the base 16 of FIGS. 2-3, which includes a base frame 17 and base component 19, the solid base 34 is a single solid structure formed of a water-impermeable, biodegradable, and compostable material such as bioplastic. As shown in FIG. 4, at least one elongate connector 22 can attach directly to the solid base 34.

Figure 5A:
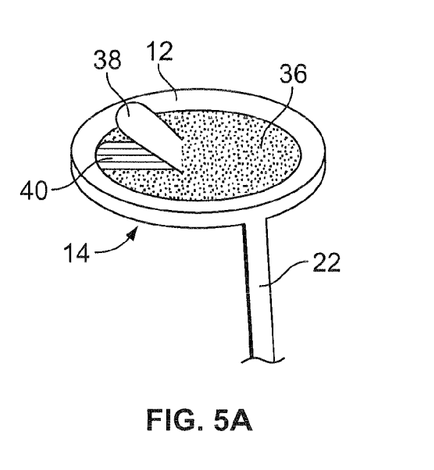
FIGS. 5A-5B are perspective views of the top of a compostable container, according to one aspect of the present invention.
Figure 5B:
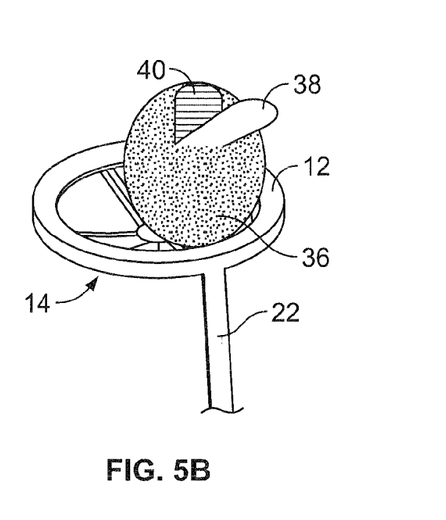

FIGS. 5A-5B are perspective views of the top of a compostable container 10. In these example views, the compostable container 10 includes a cover 36 disposed over the top frame opening 14 of the top frame 12. The cover 36 is adapted to assume a sealed position and an unsealed position. In the sealed position (FIG. 5A), the cover 36 completely obstructs the top frame opening 14, such that fluid in the compostable container 10 is not permitted to exit the compostable container 10 through the top frame opening 14. In the unsealed position (FIG. 5B), the cover 36 either only partially obstructs or does not obstruct the top frame opening 14 such that the cover 36 exposes the top frame opening 14, thereby allowing fluid in the compostable container 10 to exit the compostable container 10 through the top frame opening 14.

As shown in FIGS. 5A-5B, the cover 36 can be a single-use tear cover or repeated-use hinge cover constructed of any suitable material. For example, the cover 36 can be constructed of a bioplastic (e.g., PLA), a foil (or other thin sheet of metal), a water-permeable material, or any other suitable material. In embodiments where the cover 36 is constructed of a water-permeable material, the cover 36 optionally may include a water-impermeable coating lining on an interior side thereof, such that the cover 36 is prevented from absorbing fluid contents of the compostable container 10 that come into contact with the cover 36.

In accordance with aspects of the present invention, as shown in FIG. 5A, the cover 36 can be manufactured in the sealed position, and removed by a user partially or completely by tearing the cover 36 off of the compostable container 10 as shown in FIG. 5B. The cover 36 can be disposed over the top frame opening 14 such that the cover 36 completely obstructs the top frame opening 14 when in a sealed position. The cover 36 can be shaped to substantially correspond with the top frame opening 14. The cover 36 includes a pull tab 38 or flap that extends from the cover 36. The pull tab 38 can be bonded to the cover 36 at a bonding region 40 of the pull tab 38 or alternatively formed as a single, unitary, structure with the cover 36. The pull tab 38 can be attached to the cover 36 by an adhesive or heat-sealed for example, or bonded by any other known processes or equivalents thereof that would result in the pull tab 38 attached to the cover 36 as shown and described. With this example, the compostable container 10 can be opened by pulling the pull tab 38 causing the removal of the cover 36 from the top frame 12. This removal of the cover 38 is an unsealed position thereby exposing the top frame opening 14.

Figure 6A:
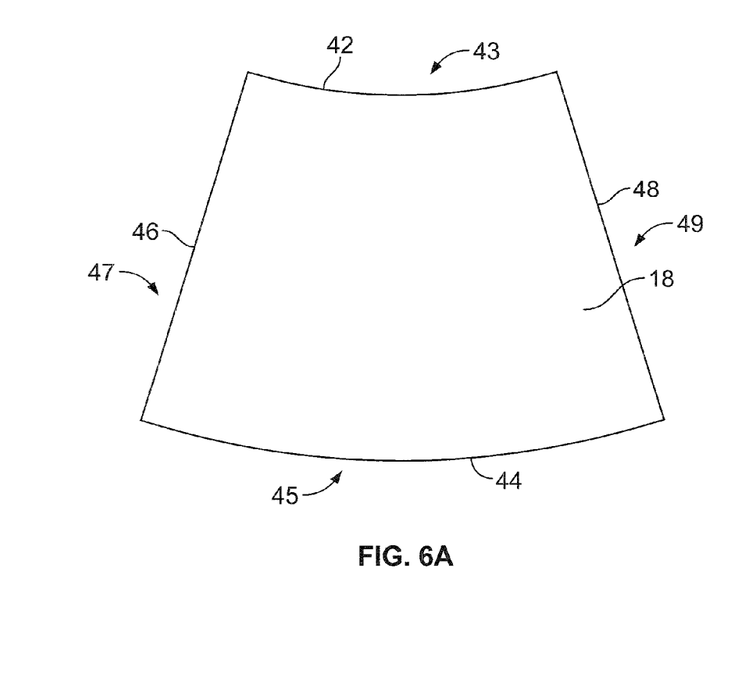
FIG. 6A is a perspective view of an unwrapped wall of a compostable container, according to one aspect of the present invention.
Figure 6B:
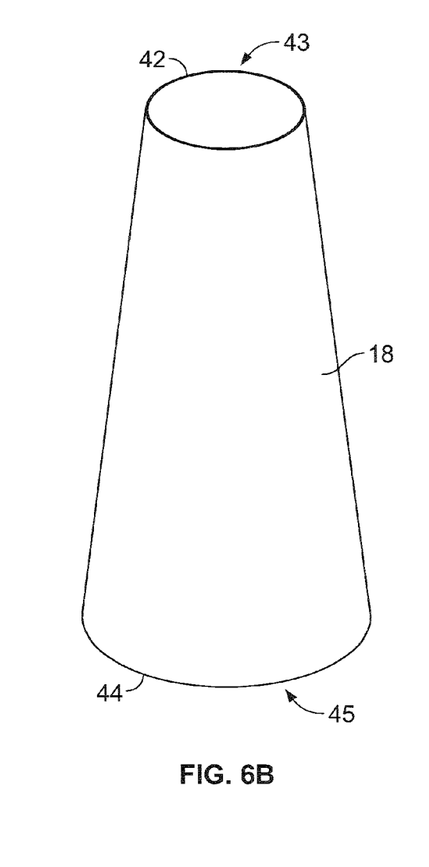
FIG. 6B is a perspective view of the wall in FIG. 6A wrapped into a conical shape of the compostable container, according to one aspect of the present invention.

FIGS. 6A-6B depict the wall 18 unwrapped (FIG. 6A) and wrapped (FIG. 6B) into a conical shape of the compostable container 10. The wall 18 has a top edge 42 at a top end 43, a bottom edge 44 at a bottom end 45 opposite the top end 43, a first side edge 46 at a first side end 47, a second side edge 48 at a second side end 49 opposite the first side end 47, and an interior facing wall surface extending between the top end 43, bottom end 45, first side end 47, and second side end 49. The wall 18 is formed of a water-permeable, biodegradable, and compostable material having a biodegradable, water-impermeable coating forming a lining across the interior facing wall surface of the wall 18.

In accordance with aspects of the present invention, the water-permeable, biodegradable, and compostable material that forms the wall is constructed of cardboard, any other cellulose-based material, or any other suitable water-permeable, biodegradable, and compostable material. For example, the wall 18 can be formed of a water-permeable, biodegradable, and compostable material comprising cellulose, starch (e.g., corn, potato, tapioca, etc.), soy protein, lactic acid, or the like. For purposes of the present description, a wall built using substantially cellulose material (e.g., paper, cardboard, etc.) is described.

The biodegradable, water-impermeable coating forms a water-impermeable lining that in combination with the other components creates a barrier that prevents water (or other liquid contents) disposed in the interior volume of the compostable container 10 from making direct physical contact with the interior side of the wall 18, interior side of the base 16 or solid base 34, and the interior side of the cover 36. This can be beneficial, for example, in preventing liquid contents of the interior volume from being absorbed by or from passing through the wall 18.

In general, the biodegradable, water-impermeable coating can be biodegradable in one or more first environmental conditions, such as standard biodegradation conditions or composting conditions, as would be appreciated by one of skill in the art. Furthermore, the one or more biodegradable, water-impermeable coating materials can be water-impermeable in one or more second environmental conditions, e.g., during conditions in which the compostable container 10 is being stored or used. In an illustrative embodiment, the biodegradable, water-impermeable coating is made of polylactic acid (PLA). Alternatively, any other suitable biodegradable, water-impermeable coating materials can be utilized with the present invention, so long as the resulting container is compostable.

Figure 7A:
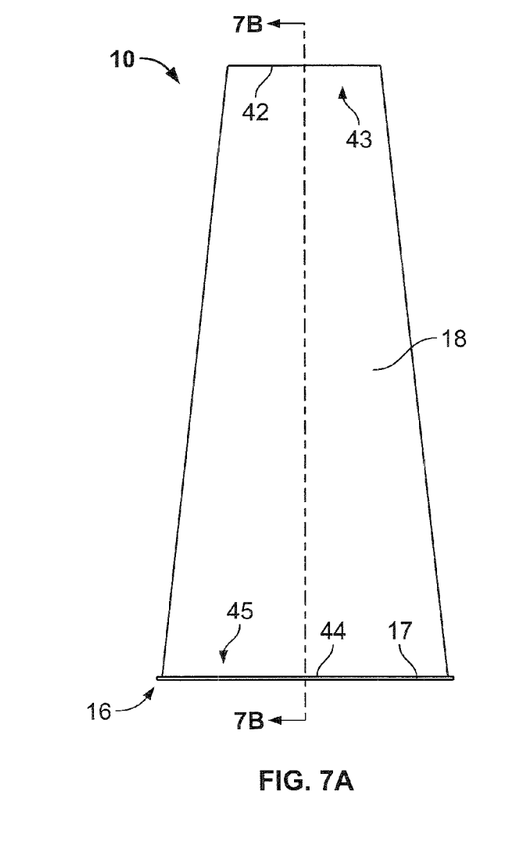
FIG. 7A is a side view of the compostable container, according to one aspect of the present invention.
Figure 7B:
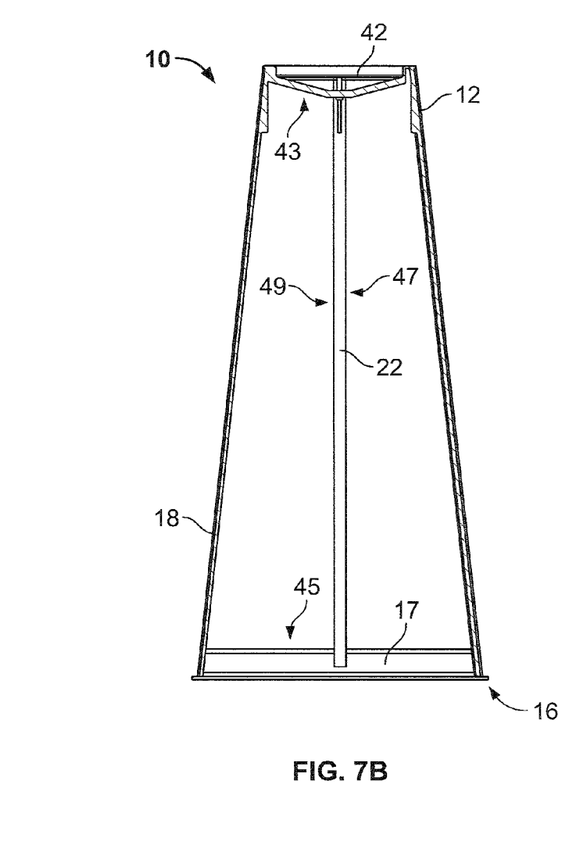
FIG. 7B is a side cross-sectional view along section 7B-7B of the compostable container in FIG. 7A, according to one aspect of the present invention.

FIG. 7A depicts a side view of the compostable container 10. FIG. 7B is a side cross-sectional view along section 7B-7B of the compostable container 10 in FIG. 7A. As shown in FIG. 7B, the top end 43 of the wall 18 is coupled to the top frame 12, the bottom end 45 of the wall 18 is coupled to the base 16 (i.e., base frame 17), the first side end 47 of the wall 18 is coupled to the elongate connector 22, and the second side end 49 of the wall 18 opposite the first side end 47 is coupled to the elongate connector 22. The wall 18 is coupled to the top frame 12, base 16, and elongate connector 22 in such a way as to prevent direct exposure of the top edge 42 at the top end 43, bottom edge 44 at the bottom end 45, first side edge 46 at the first side end 47, and second side edge 48 of the second side end 49 of the wall 18 to the interior volume of the compostable container 10 and any water-based liquid substance contained within the compostable container 10. This is achieved by sealing each of the edges 42, 44, 46, and 48 against the top frame 12, base 16, and elongate connector 22 as described herein, thereby blocking and preventing any contact between any water-based liquid and any of the edges 42, 44, 46, and 48. In one example, the top edge 42 of the top end 43 of the wall 18 is bonded to the top frame 12 by an adhesive. In an alternative example, the top edge 42 of the top end 43 of the wall 18 is heat-welded or ultrasonically welded to the top frame 12. As shown in FIGS. 7A and 7B, the base 16 extends outward and below the bottom edge 44 at the bottom end 45 of the wall 18 to maintain the wall 18 in place. In accordance with aspects of the present invention, the bottom edge 44 of the wall 18 is bonded to the base 16 by an adhesive, or is heat-welded or ultrasonically welded to the base 16.

Figure 8A:
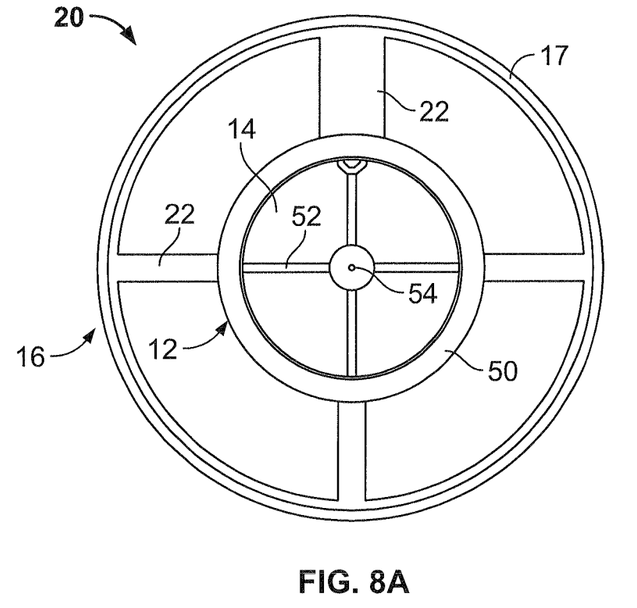
FIG. 8A is a top view of the compostable container without the wall, according to one aspect of the present invention.
Figure 8B:
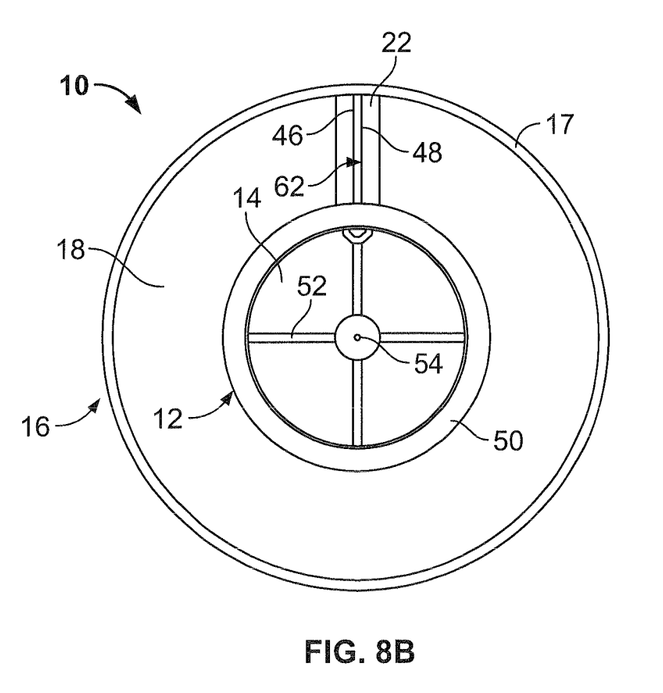
FIG. 8B is top view of the compostable container with the wall, according to one aspect of the present invention.

FIG. 8A is a top view of the container frame 20 of FIG. 3. FIG. 8B is a top view of the compostable container 10 with the wall 18. As shown in FIGS. 8A-8B, the top frame 12 includes an outer frame component 50 with truss components 52 coupled to and disposed within the outer frame component 50. In this example container frame 20, there are four truss components 52 configured within the outer frame component 50 to form a "+" shape within the top frame opening 14. The truss components 52 together form the molding runner system used for the injection molding process of creating the top frame 12 for example. An aperture 54 is disposed where the truss components 52 intersect with each other. The aperture 54 may be used as an injection molding grating area such as a "fill hole" or guide hole in a method of manufacturing the compostable container 10, as would be appreciated by one of skill in the art upon reading the present specification. The truss components 52 are not required to maintain the structure of the container frame 20 as would be appreciated by those of skill in the art. Rather, they are a secondary effect of one form of a manufacturing process for the compostable container 10. As such, the present invention is by no means limited to a structure that requires the truss components 52 across the top frame opening 14.

As shown in FIG. 8B, the first side edge 46 and second side edge 48 of the wall 18 form a seam 62 along the elongate connector 22 where the first side edge 46 is coupled to the elongate connector 22 and the second side edge 48 is coupled to the elongate connector 22. This seam 62 is formed by heat-welding or ultrasonic welding the first side edge 46 and second side edge 48 of the wall 18 along the elongate connector 22. In an alternative example, the seam 62 is formed by bonding the first side edge 46 and second side edge 48 of the wall 18 along the elongate connector 22 with an adhesive. As shown in FIGS. 8A-8B, the elongate connector 22 that seals the seam 62 can be slightly wider than the other elongate connectors 22. In one example, the elongate connectors 22 can act as runners for the manufacturing process (e.g., three vertical runners and one wide seam runner for seam sealing).

Figure 9:
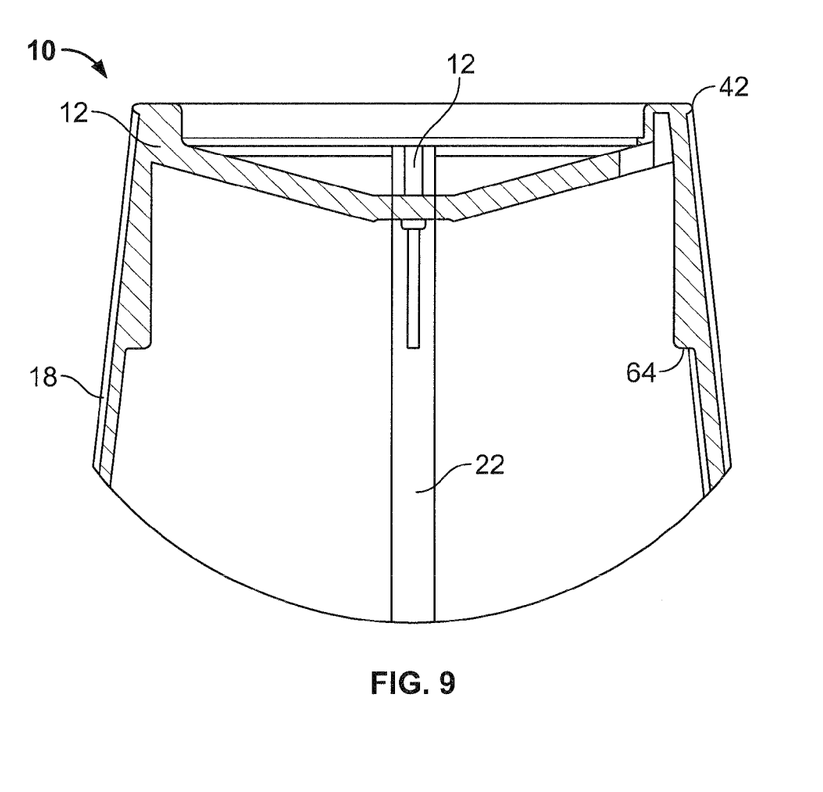
FIG. 9 is a partial cross-sectional view of the upper portion of the compostable container, according to one aspect of the present invention.

FIG. 9 depicts a partial cross-sectional view of the upper portion of the compostable container 10. As shown, the top frame 12 extends outward and over the top edge 42 of the wall 18 in order to maintain the wall 18 in place and to seal the top edge 42 from access to the interior volume of the compostable container 10.

The edges (top edge 42, bottom edge 44, first side edge 46, and second side edge 48 of the wall 18) (see FIG. 6A) are exposed when the wall 18 is cut to proper dimensions during manufacturing. This causes the creation of an exposed edge that does not have the biodegradable, water-impermeable coating. This issue is addressed by the compostable container 10. In particular, as shown in FIG. 8B, the seam 62, where the first side edge 46 and second side edge 48 meet or are close to meeting, is completely blocked from access or exposure to the interior volume of the compostable container 10 and any water-based liquid substance contained therein. This separation is due to the elongate connector 22 providing a seal that prevents a liquid contained inside the container from gaining access to the seam 62. For example, the first side edge 46 and second side edge 48 are adhered or welded to the elongate connector 22 such that the adhesion or weld is along the surface or edge of the elongate connector 22. This blocks the first side edge 46 and second side edge 48 from having any access or exposure to the interior volume of the compostable container 10 (and any contents thereof). As shown in FIG. 9, the top frame 12 completely blocks the top edge 42 from having any access or exposure to the interior volume of the compostable container 10 by the top frame 12 being adhered or welded to the top edge 42 of the wall 18. Also, as shown in FIGS. 7A-7B, the bottom edge 44 of the wall 18 is adhered or welded to the base 16 (i.e., base frame 17) such that the bottom edge 44 is completely blocked from having any access or exposure to the interior volume of the compostable container 10. This configuration prevents any liquid contents in the compostable container 10 from being able to reach or access any of the exposed edges of the wall 18.

Figure 10A:
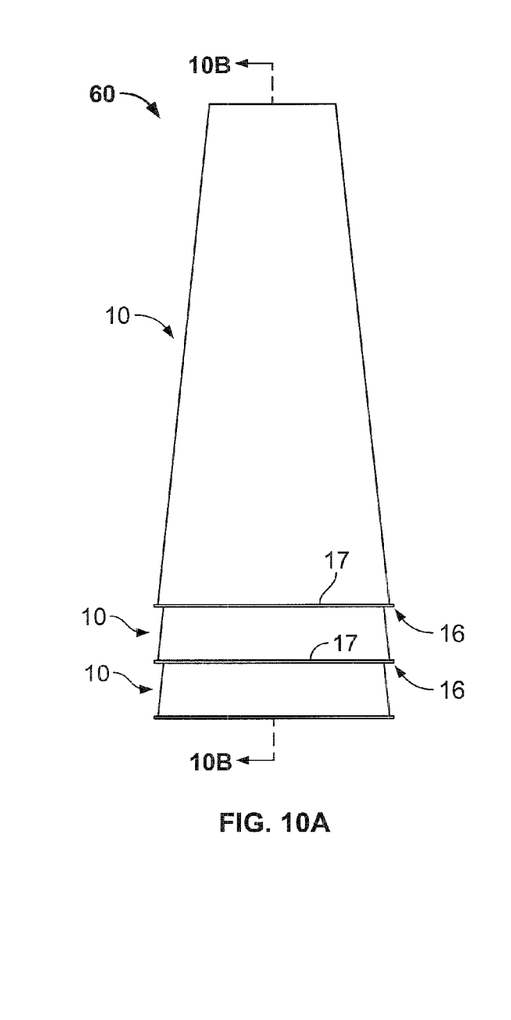
FIG. 10A is a perspective view of compostable containers stacked, according to one aspect of the present invention.
Figure 10B:
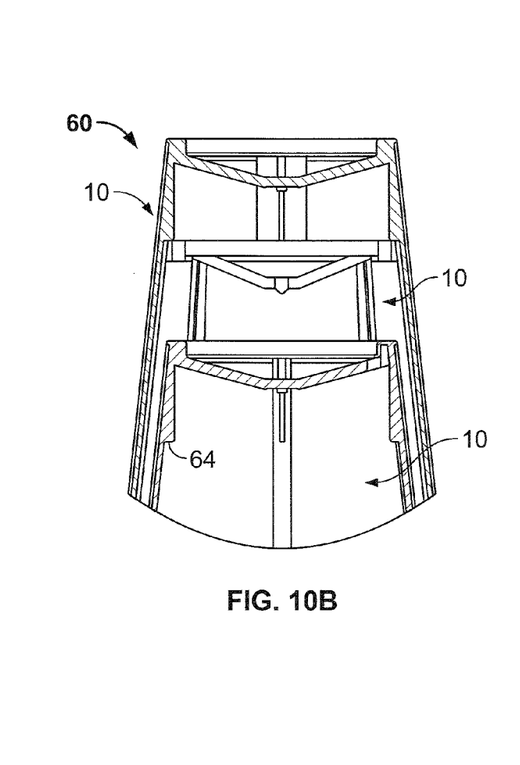
FIG. 10B is a cross-sectional view of the stacked compostable containers of FIG. 10A, according to one aspect of the present invention.

FIGS. 10A-10B depict a stacked formation 60 of the compostable containers 10 stacked together. Each compostable container 10 is configured to stack on top of and below another compostable container 10. In this formation, the base 16 includes a base frame 17 but does not yet include the base component 19 to allow the compostable containers 10 to be configured for stacking. The stacked formation 60 of the compostable containers 10 is particularly useful during the manufacturing process.

As shown in FIGS. 9 and 10B, the lower section of the top frame 12 can include a mechanical stop 64 that enables the stacking of compostable containers 10 to form the stacked formation 60. An inserting compostable container 10 is introduced through a central opening in the base frame 17 of a receiving compostable container 10. The mechanical stop 64 of the receiving compostable container 10 provides an edge for stopping movement of the inserting compostable container 10 and supports the inserting compostable container 10 in place within the receiving compostable container 10. Multiple compostable containers 10 can be stacked on top of each other and supported in place using this mechanical stop 64 feature. The stacked formation 60 is not required to maintain the structure of the compostable container 10 as would be appreciated by those of skill in the art. Rather, this is an additional structure feature that can be added, if desired. As such, the present invention is by no means limited to a structure that requires the ability to create the stacked formation 60.

Figure 11A:
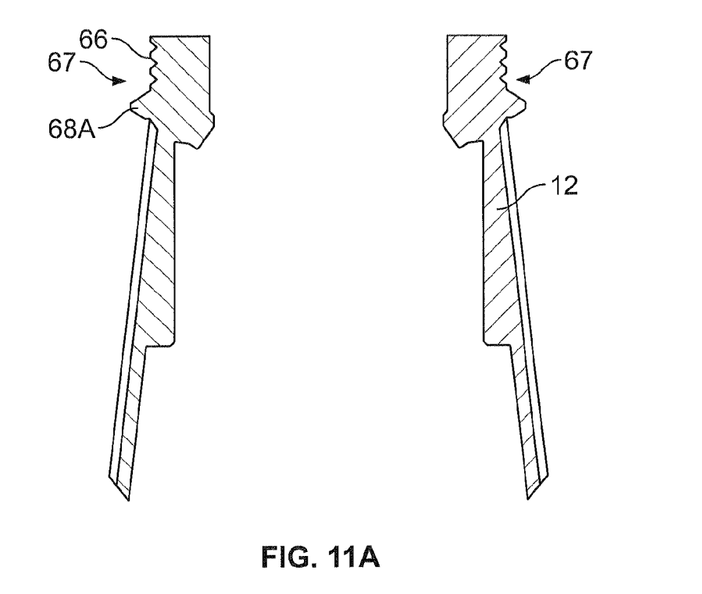
FIGS. 11A-11B are cross-sectional views of the upper portion of a compostable container having an external threading feature, according to aspects of the present invention.
Figure 11B:
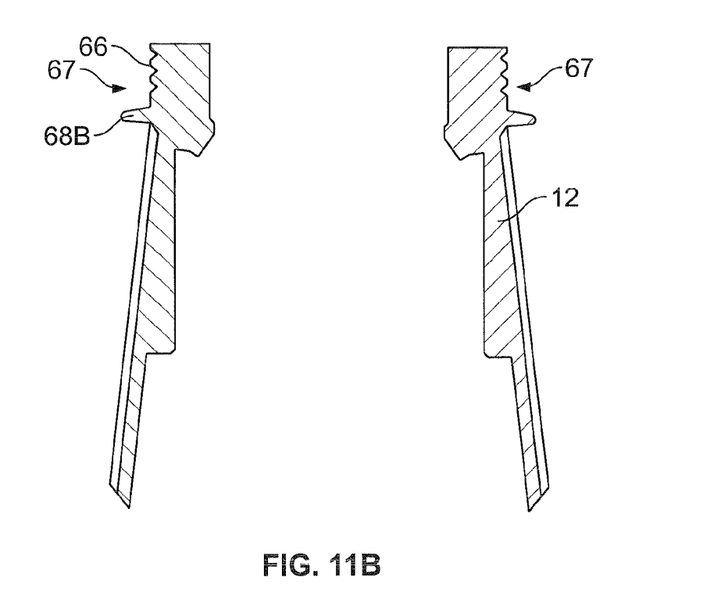
Figure 12A:
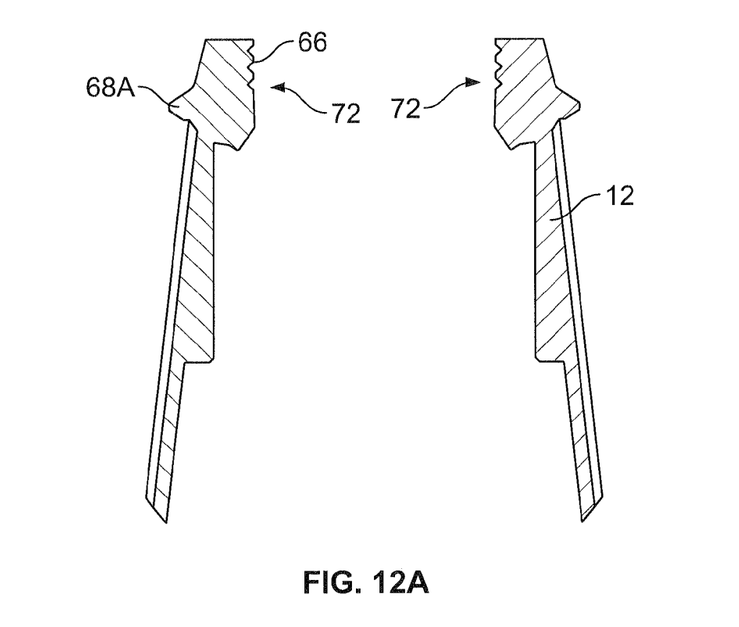
FIGS. 12A-12B are cross-sectional views of the upper portion of a compostable container having an internal threading feature, according to aspects of the present invention.
Figure 12B:
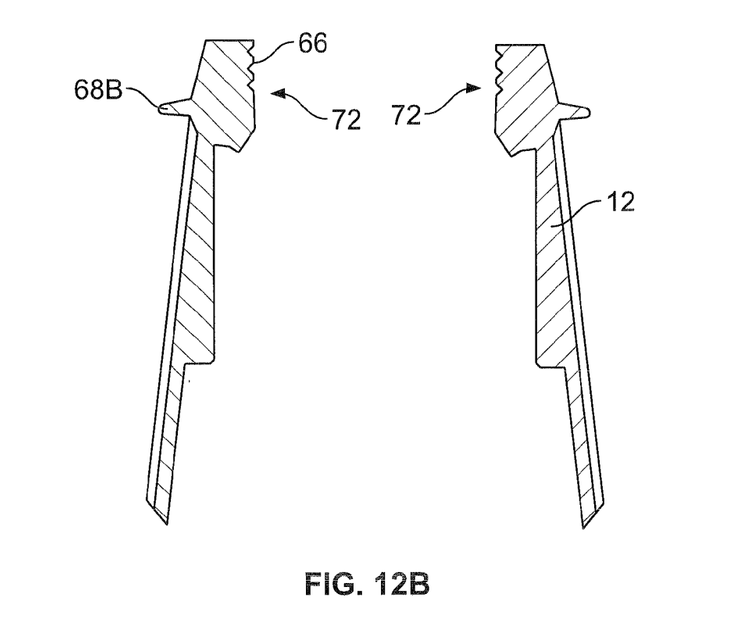

FIGS. 11A-11B depict a cross-sectional illustration of an example compostable container 10 having an external threading feature 67 along the external surface of the top frame 12, particularly at the upper portion or neck portion of the top frame 12. In another example, FIGS. 12A-12B depict a partial compostable container 10 having an internal threading feature 72 along the internal surface of the top frame 12. The external threading feature 67 or internal threading feature 72 each enable a user to repeatedly open and reseal the compostable container 10 with a threaded cap as is conventional in the field.

The external threading feature 67 enables a cap with internal female threading to be fastened over the upper portion of the top frame 12 (i.e., cap threadably receives the external threading feature 67). As shown in FIGS. 11A-11B, the external threading feature 67 includes a continuous thread 66 along the external surface of the top frame 12. When in use, the cap can follow along the thread 66 and lock at the end of the thread 66 (i.e., sealing the compostable container 10) or unlock from the end of the thread 66 (i.e., unsealing the compostable container 10) when the cap is unscrewed. The compostable container 10 can include an annular projection 68A, 68B adjacent to the continuous thread 66. The annular projection 68A, 68B provides a handle or grasp function for manufacturing purposes. For example, a conventional machine used in manufacturing (e.g., used in filling the compostable container 10 with a water-based substance) can lift and move the compostable container 10 during the manufacturing process by clutching onto the annular projection 68A, 68B of the compostable container 10. As appreciated by one of skill in the art, the annular projection 68A, 68B can have various diameters, sizes, shapes, etc. within the scope of manufacturing the compostable container 10. For example, the annular projection 68A in FIG. 11A has a smaller diameter compared to the annular projection 68B in FIG. 11B.

The internal threading feature 72 enables a cap with external male threading to be fastened into the upper portion of the top frame 12 (i.e., internal threading feature 72 threadably receives the cap). As shown in FIGS. 12A-12B, the internal threading feature 72 includes a continuous thread 66 along the internal surface of the top frame 12. When in use, the cap can follow along the thread 66 and lock within the end of the thread 66 (i.e., sealing the compostable container 10) or unlock from the end of the thread 66 (i.e., unsealing the compostable container 10) when the cap is unscrewed. As described above, the compostable container 10 can include an annular projection 68A, 68B adjacent to the continuous thread 66. One of skill in the art can appreciate an annular projection 68A, 68B as having various diameters, sizes, shapes, etc. within the scope of manufacturing the compostable container 10.

Numerous modifications and alternative embodiments of the present invention will be apparent to those skilled in the art in view of the foregoing description. Accordingly, this description is to be construed as illustrative only and is for the purpose of teaching those skilled in the art the best mode for carrying out the present invention. Details of the structure may vary substantially without departing from the spirit of the present invention, and exclusive use of all modifications that come within the scope of the appended claims is reserved. Within this specification embodiments have been described in a way which enables a clear and concise specification to be written, but it is intended and will be appreciated that embodiments may be variously combined or separated without parting from the invention. It is intended that the present invention be limited only to the extent required by the appended claims and the applicable rules of law.

It is also to be understood that the following claims are to cover all generic and specific features of the invention described herein, and all statements of the scope of the invention which, as a matter of language, might be said to fall therebetween.

What is claimed is:
1. A compostable container, comprising:
a top frame having a top frame opening and a mechanical stop configured to support stacking of an additional container placed thereon;
a base at an opposite end of the container from the top frame and the mechanical stop;
an elongate connector coupling the top frame with the base; and
a wall having a top edge at a top end, a bottom edge at a bottom end opposite the top end, a first side edge at a first side end, a second side edge at a second side end opposite the first side end, and an interior facing wall surface extending between the top end, bottom end, first side end, and second side end;
wherein the wall, the base, the elongate connector, and the top frame in combination form the container having an interior volume with the top frame opening providing access into the interior volume;

wherein the top end is coupled to the top frame, the bottom end is coupled to the base, the first side end is coupled to the elongate connector, and the second side end is coupled to the elongate connector, in such a way as to prevent direct exposure of the top edge, bottom edge, first side edge, and second side edge to the interior volume of the container and any water-based liquid substance contained therein;

wherein the first side edge and the second side edge in combination form a seam along the elongate connector without exposure of the seam to the interior volume of the container, where the first side end is coupled to the elongate connector and the second side end is coupled to the elongate connector; and wherein the wall is formed of a water-permeable, biodegradable, and compostable material having a biodegradable, water-impermeable coating forming a lining across the interior facing wall surface of the wall.

2. The container of claim 1, wherein the base comprises a base frame with a base component coupled thereto, the base component formed of a water-permeable, biodegradable, and compostable material having a biodegradable, water-impermeable coating forming a lining across an interior facing surface of the base component.

3. The container of claim 1, wherein the base is a solid structure formed of a water-impermeable, biodegradable, and compostable material.

4. The container of claim 1, wherein the base is formed of a bioplastic material.

5. The container of claim 1, wherein the elongate connector is formed of a bioplastic material.

6. The container of claim 1, wherein the container breaks down into carbon dioxide, water, inorganic compounds, and biomass materials.

7. The container of claim 1, wherein the container breaks down into carbon dioxide, water, inorganic compounds, and biomass materials, at a rate consistent with known compostable materials.

8. The container of claim 1, wherein the top edge of the wall is bonded to the top frame by an adhesive.

9. The container of claim 1, wherein the top edge of the wall is heat-welded to the top frame.

10. The container of claim 1, wherein the top frame extends outward and over the top edge of the wall to maintain the wall in place.

11. The container of claim 1, wherein the bottom edge of the wall is bonded to the base by an adhesive.

12. The container of claim 1, wherein the bottom edge of the wall is heat-welded to the base.

13. The container of claim 1, wherein the base extends outward and below the bottom edge of the wall to maintain the wall in place.

14. The container of claim 1, further comprising a cover disposed over the top frame opening completely obstructing the top frame opening when in a sealed position and exposing the top frame opening when in an unsealed position.

15. The container of claim 14, wherein the cover comprises a repeated-use hinge cover or a single-use tear cover.

16. The container of claim 1, wherein the container is configured to stack on top of and below another container.

17. The container of claim 16, wherein the top frame further comprises the mechanical stop at a lower section of the top frame for allowing the container to stack on top of and below another container, wherein the mechanical stop provides an edge for supporting another container inserted into the container.

18. The container of claim 1, wherein the water-permeable, biodegradable, and compostable material of which the wall is formed comprises cellulose.

19. The container of claim 1, wherein the biodegradable, water-impermeable coating is polylaticacid (PLA).

20. The container of claim 1, wherein the top frame further comprises an outer frame component with a truss component coupled to and disposed within the outer frame component.

21. The container of claim 1, wherein the container is generally conical in shape, and wherein the top frame forms a ring and the base forms a ring.

22. The container of claim 1, wherein the container is generally conical in shape, and wherein the top frame forms a ring and the base forms a circle.

23. The container of claim 1, wherein the seam is formed by heat-welding the first side end and second side end along the elongate connector.

24. The container of claim 1, wherein the seam is formed by bonding the first side end and second side end along the elongate connector with an adhesive.

25. The container of claim 1, wherein the top frame further comprises an external threading feature along an external surface of the top frame configured to receive and threadedly couple with a cap.

26. The container of claim 1, wherein the top frame further comprises an annular projection on an external surface of the top frame.

27. The container of claim 1, wherein the top frame further comprises an internal threading feature along an internal surface of the top frame configured to receive and threadedly couple with a cap.

* * * * *